(12) United States Patent
Sakurai (10) Patent No.: US 9,177,669 B2
(45) Date of Patent: Nov. 3, 2015

(54) STORAGE-MEDIUM DIAGNOSIS DEVICE, STORAGE-MEDIUM DIAGNOSIS METHOD

(71) Applicant: FUJITSU LIMITED, Kawasaki-shi, Kanagawa (JP)

(72) Inventor: Hiroshi Sakurai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 333 days.

(21) Appl. No.: 13/770,318

(22) Filed: Feb. 19, 2013

(65) Prior Publication Data

US 2013/0166973 A1    Jun. 27, 2013

Related U.S. Application Data

(63) Continuation of application No. PCT/JP2010/064749, filed on Aug. 30, 2010.

(51) Int. Cl.
| | | |
|---|---|---|
| G11C 29/56 | (2006.01) | |
| G11C 29/08 | (2006.01) | |
| G11B 20/18 | (2006.01) | |
| G11B 27/36 | (2006.01) | |
| G06F 11/22 | (2006.01) | |

(52) U.S. Cl.
CPC ............ *G11C 29/08* (2013.01); *G06F 11/2221* (2013.01); *G11B 20/18* (2013.01); *G11B 27/36* (2013.01); *G11B 2220/2516* (2013.01)

(58) Field of Classification Search
CPC ....................................................... G11C 29/56
USPC ........................................................ 714/718
See application file for complete search history.

(56) References Cited

U.S. PATENT DOCUMENTS

| | | | | |
|---|---|---|---|---|
| 2005/0262394 | A1* | 11/2005 | Yasukawa et al. | 714/23 |
| 2008/0250042 | A1* | 10/2008 | Mopur et al. | 707/100 |
| 2012/0252441 | A1* | 10/2012 | Fujimoto et al. | 455/425 |
| 2013/0156267 | A1* | 6/2013 | Muraoka et al. | 382/103 |

FOREIGN PATENT DOCUMENTS

| | | |
|---|---|---|
| JP | 2-253323 | 10/1990 |
| JP | 2000-339107 | 12/2000 |
| WO | WO 2009/001413 A1 | 12/2008 |

OTHER PUBLICATIONS

International Search Report of PCT/JP2010/064749 mailed Oct. 12, 2010.

\* cited by examiner

*Primary Examiner* — Fritz Alphonse
(74) *Attorney, Agent, or Firm* — Staas & Halsey LLP (57) ABSTRACT

A storage-medium diagnosis includes a storage unit that stores therein respective diagnosis results of subregions of a storage region of a storage medium; a higher-access executing unit that accesses a region corresponding to access request from a higher-level device, and stores a result of the access as a diagnosis result in the storage unit; a diagnosis-region identifying unit that identifies a diagnosis region to be diagnosed next on the basis of the respective diagnosis results of the subregions stored in the storage unit; and a diagnosis executing unit that accesses and diagnoses the diagnosis region identified by the diagnosis-region identifying unit, and stores a result of the diagnosis in the storage unit. The storage-medium diagnosis can reduce the time used for diagnosis of the storage medium and suppress degradation in performance even during operation.

9 Claims, 8 Drawing Sheets

| | | 41 |
|---|---|---|
| 41a | IDENTIFICATION NUMBER OF HDD | 00000001 |
| 41b | DIAGNOSIS TIME LIMIT | 2 week |
| 41c | DIAGNOSIS CYCLE | 3 week |
| 41d | DIAGNOSIS ADDRESS COUNTER | 2 |
| 41e | DIAGNOSIS INTERVAL | 5 MINUTES |
| 41f | DIAGNOSIS ACCESS UNIT | 10 LBA |
| 41g | DIAGNOSIS PRIORITY RANGE | WITHIN 100 LBA |
| 41h | PREFETCH NUMBER | 10 LBA |
| 41i | PREFETCH START SEEK DISTANCE | 1000 LBA OR MORE |

FIG.5

| | 0 | 1 | 2 | ... | N |
|---|---|---|---|---|---|
| 0 | 0 | 0 | 1 | 1 | 1 |
| 1 | 1 | 1 | 0 | 1 | 1 |
| 2 | 1 | 0 | 0 | 0 | 0 |
| ⋮ | 1 | 1 | 1 | 1 | 1 |
| N | 1 | 1 | 1 | 1 | 1 |

| IDENTIFICATION NUMBER OF HDD | 00000001 |
|---|---|
| DIAGNOSIS TIME LIMIT | 2 week |
| DIAGNOSIS CYCLE | 3 week |
| DIAGNOSIS ADDRESS COUNTER | 1 |
| DIAGNOSIS INTERVAL | 5 MINUTES |
| DIAGNOSIS ACCESS UNIT | 20 LBA |
| DIAGNOSIS PRIORITY RANGE | WITHIN 100 LBA |
| PREFETCH NUMBER | 20 LBA |
| PREFETCH START SEEK DISTANCE | 1000 LBA OR MORE |

41f points to DIAGNOSIS ACCESS UNIT row.

| IDENTIFICATION NUMBER OF HDD | 00000001 |
|---|---|
| DIAGNOSIS TIME LIMIT | 2 week |
| HIGHER ACCESS FREQUENCY | 100 MB/s |
| DIAGNOSIS CYCLE | 3 week |
| DIAGNOSIS ADDRESS COUNTER | 1 |
| DIAGNOSIS INTERVAL | 5 MINUTES |
| DIAGNOSIS ACCESS UNIT | STRIPE LENGTH x 10 |
| DIAGNOSIS PRIORITY RANGE | WITHIN 100 LBA |
| PREFETCH NUMBER | STRIPE LENGTH x 10 |
| PREFETCH START SEEK DISTANCE | 1000 LBA OR MORE |

41f points to DIAGNOSIS ACCESS UNIT row.
41h points to PREFETCH NUMBER row.

FIG.11

| | | |
|---|---|---|
| | IDENTIFICATION NUMBER OF HDD | 00000001 |
| 41b | DIAGNOSIS TIME LIMIT | 2 week |
| 41k | DIAGNOSIS ELAPSED TIME | A |
| 41l | DIAGNOSIS REMAINING CAPACITY | C |
| | DIAGNOSIS CYCLE | 3 week |
| | DIAGNOSIS ADDRESS COUNTER | 1 |
| 41e | DIAGNOSIS INTERVAL | Y |
| 41f | DIAGNOSIS ACCESS UNIT | X |
| | DIAGNOSIS PRIORITY RANGE | WITHIN 100 LBA |
| 41h | PREFETCH NUMBER | X |
| | PREFETCH START SEEK DISTANCE | 1000 LBA OR MORE |

FIG.12

STORAGE-MEDIUM DIAGNOSIS DEVICE, STORAGE-MEDIUM DIAGNOSIS METHOD

CROSS-REFERENCE TO RELATED APPLICATION

This application is a continuation of International Application No. PCT/JP2010/064749, filed on Aug. 30, 2010, the entire contents of which are incorporated herein by reference.

FIELD

The embodiments discussed herein are directed to a storage-medium diagnosis device, and a storage-medium diagnosis method.

BACKGROUND

Conventionally, to ensure the reliability of a storage medium installed in a server, diagnosis of the storage medium is regularly or irregularly performed when the server is not in operation. In recent years, the capacity of a storage medium is significantly increasing; therefore, in most cases, diagnosis of a storage medium is not completed while a server is not in operation and goes on even after the server is put into operation.

Patent document 1 Japanese Laid-open Patent Publication No. 2000-339107

However, if the diagnosis of the storage medium is performed when the server is in operation, the time used for the diagnosis gets longer, resulting in degradation in operation performance of the server.

SUMMARY

According to an aspect of an embodiment, a storage-medium diagnosis device includes a storage unit, a higher-access executing unit, a diagnosis-region identifying unit and a diagnosis executing unit. The storage unit stores therein respective diagnosis results of subregions of a storage region of a storage medium. The higher-access executing unit accesses a region corresponding to access request from a higher-level device, and stores a result of the access as a diagnosis result in the storage unit. The diagnosis-region identifying unit identifies a diagnosis region to be diagnosed next on the basis of the respective diagnosis results of the subregions stored in the storage unit. The diagnosis executing unit accesses and diagnoses the diagnosis region identified by the diagnosis-region identifying unit, and stores a result of the diagnosis in the storage unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Incidentally, the invention is not limited to the present embodiments.

[a] First Embodiment

Figure 1:
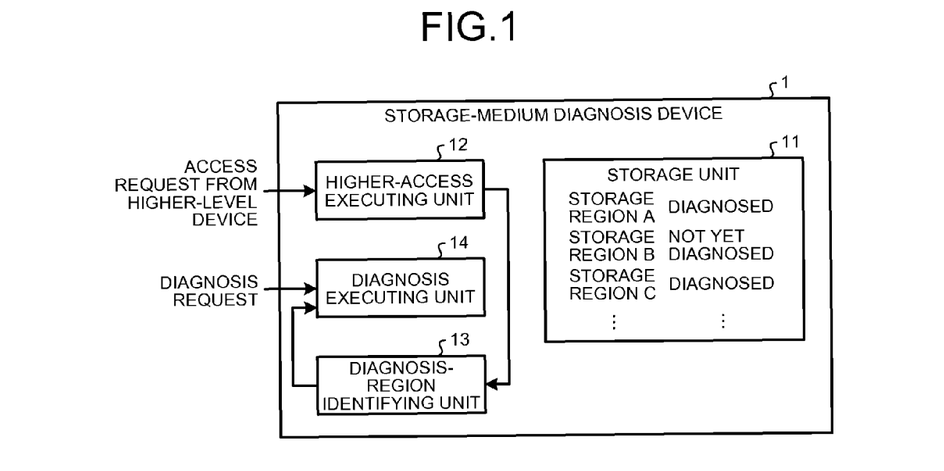
FIG. 1 is a functional block diagram illustrating a configuration of a storage-medium diagnosis device according to a first embodiment.

FIG. 1 is a functional block diagram illustrating a configuration of a storage-medium diagnosis device 1 according to a first embodiment. As illustrated in FIG. 1, the storage-medium diagnosis device 1 includes a storage unit 11, a higher-access executing unit 12, a diagnosis-region identifying unit 13, and a diagnosis executing unit 14.

The storage unit 11 stores therein respective diagnosis results of subregions in a storage region of a storage medium. The higher-access executing unit 12 accesses a region corresponding to access request from a higher-level device, and stores a result of the access as a diagnosis result in the storage unit 11. The diagnosis-region identifying unit 13 identifies a diagnosis region to be diagnosed next on the basis of the respective diagnosis results of the subregions stored in the storage unit 11. The diagnosis executing unit 14 accesses and diagnoses the diagnosis region identified by the diagnosis-region identifying unit 13, and stores a result of the diagnosis in the storage unit 11.

In this way, the storage-medium diagnosis device 1 stores a result of access to a region by access request from a higher-level device as a diagnosis result in the storage unit 11. Consequently, the storage-medium diagnosis device 1 does not have to cause the diagnosis executing unit 14 to diagnose this region, and therefore can increase a diagnostic efficiency during operation and reduce the time used for diagnosis of the storage medium during operation. Furthermore, the storage-medium diagnosis device 1 can suppress degradation in performance of the diagnosis of the storage medium even during operation.

[b] Second Embodiment

Configuration of Server Device According to Second Embodiment

Figure 2:
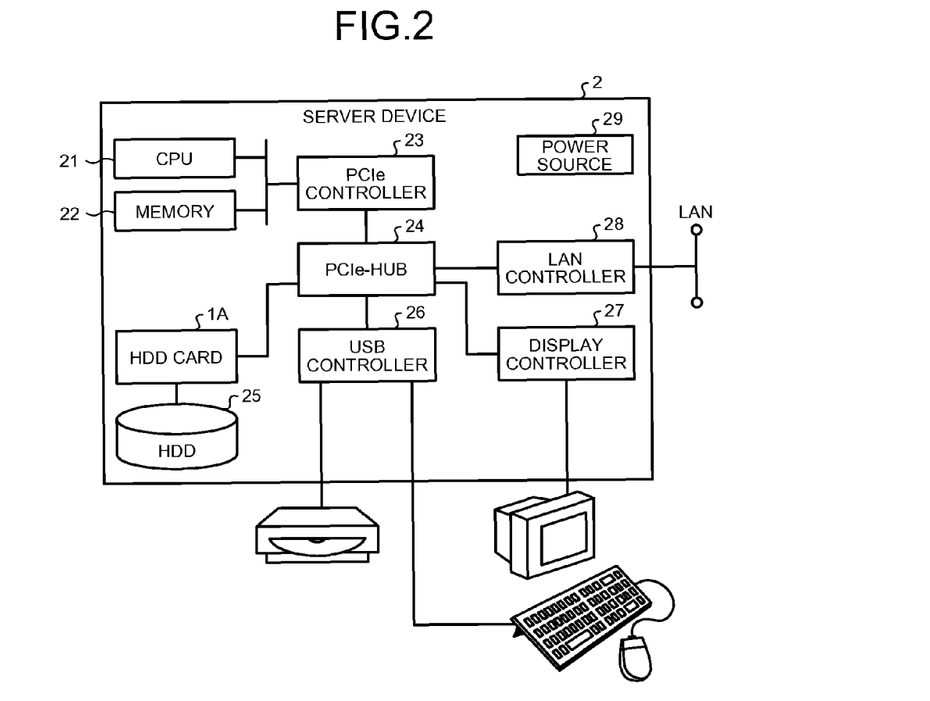
FIG. 2 is a functional block diagram illustrating a configuration of a server device equipped with a storage-medium diagnosis device according to a second embodiment.

FIG. 2 is a functional block diagram illustrating a configuration of a server device 2 equipped with a storage-medium diagnosis device according to a second embodiment. As illustrated in FIG. 2, the server device 2 includes a central processing unit (CPU) 21, a memory 22, a PCI-Express (hereinafter, "PCIe") controller 23, a PCIe-HUB 24, and an HDD card 1A corresponding to the storage-medium diagnosis device. The server device 2 further includes a hard disk (HDD) 25 including a storage medium to be diagnosed, a USB controller 26, a DISPLAY controller 27, a LAN controller 28, and a power source 29. Incidentally, there is described a case where the server device 2 adopts a PCI-Express bus; however, it is not limited to this.

The CPU 21 is connected to the memory 22 storing therein various programs and various data, and executes the programs. The PCIe controller 23 connects the CPU 21 and the memory 22 to the PCIe-HUB 24, and controls a bus including a PCI-Express interface. The PCIe-HUB 24 is a hub compliant with the PCI-Express interface standard. The PCIe-HUB 24 connects the HDD card 1A, the USB controller 26, the DISPLAY controller 27, and the LAN controller 28 by using PCI-Express interfaces.

The HDD card 1A diagnoses storage regions of the storage medium included in the HDD 25, and, upon request for access to the HDD 25 from a higher-level device through a LAN during the diagnosis, accesses a storage region corresponding to the access request and treats a result of the access as a diagnosis result. For example, the HDD card 1A diagnoses storage regions of the storage medium included in the HDD 25 in a predetermined access unit at a predetermined diagnosis interval. Then, the HDD card 1A completes the diagnosis of the HDD 25 within a predetermined diagnosis time limit. Upon access request from a higher-level device during the diagnosis in the diagnosis time limit, the HDD card 1A accesses a storage region corresponding to the access request through the HDD 25 and treats a result of the access to the storage region as a diagnosis result. Incidentally, the configuration and operation of the HDD card 1A will be described in detail later.

The USB controller 26 controls a USB CD device and a USB keyboard. The DISPLAY controller 27 controls a display. The LAN controller 28 controls a LAN. The power source 29 is a main power supply which gets the server device 2 to work or a backup power supply which backs up the main power supply.

Configuration of HDD Card According to Second Embodiment

Figure 3:
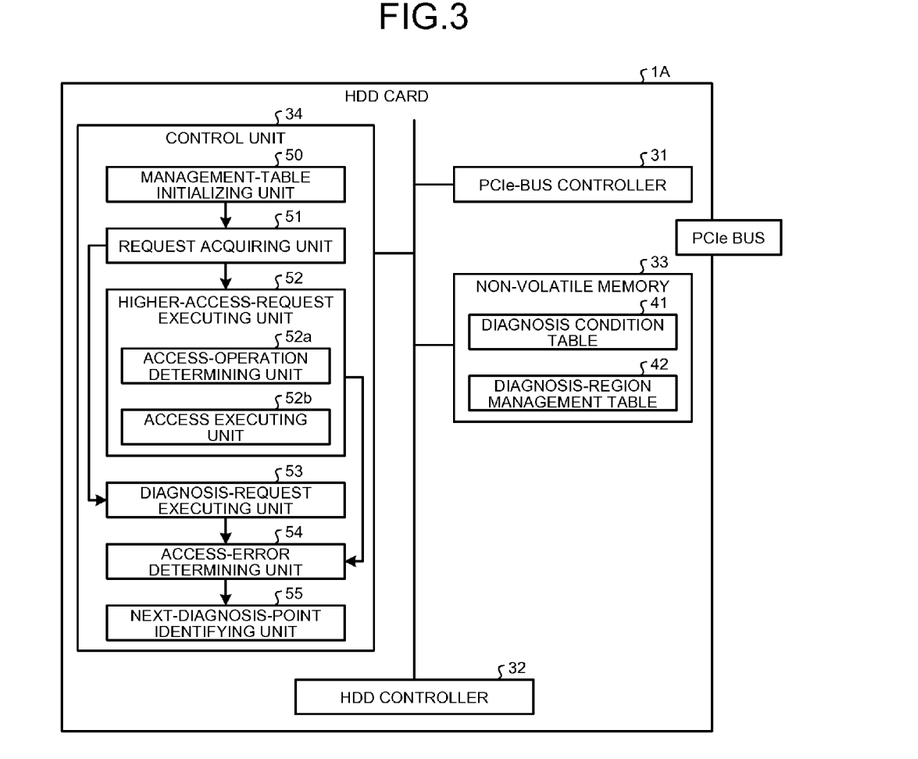
FIG. 3 is a functional block diagram illustrating a configuration of an HDD card according to the second embodiment.

FIG. 3 is a functional block diagram illustrating a configuration of the HDD card 1A according to the present second embodiment. As illustrated in FIG. 3, the HDD card 1A includes a PCIe-BUS controller 31, an HDD controller 32, a non-volatile memory 33, and a control unit 34. The PCIe-BUS controller 31 controls a PCI-Express interface bus. The HDD controller 32 controls the HDD 25.

The non-volatile memory 33 is a memory that does not lose data held therein even when no power is supplied from the power source 29, and includes, for example, a semiconductor memory device, such as a flash memory, or a storage device, such as a hard disk and an optical disk. The non-volatile memory 33 includes a diagnosis condition table 41 and a diagnosis-region management table 42. The diagnosis condition table 41 stores therein a diagnosis condition used in diagnosing the storage medium included in the HDD 25. The diagnosis-region management table 42 stores therein 1-bit access locations to be diagnosed in a unit of minimal access to the storage medium in the HDD 25 and a value indicating whether each of the access locations has been diagnosed or not. The diagnosis condition table 41 and the diagnosis-region management table 42 are held in each HDD 25, and are periodically expanded from the HDD 25 into the non-volatile memory 33. Furthermore, respective contents of the diagnosis condition table 41 and the diagnosis-region management table 42 are written into the corresponding tables held in each HDD 25 at the timing which does not exert any influence on access from a higher-level device. Incidentally, details of the diagnosis condition table 41 and the diagnosis-region management table 42 will be described later.

The control unit 34 sequentially diagnoses storage regions in a unit of minimal access to the HDD 25, and, upon access request from a higher-level device, accesses a storage region corresponding to the access request and stores a result of the access as a diagnosis result in the diagnosis-region management table 42. The control unit 34 includes a management-table initializing unit 50, a request acquiring unit 51, a higher-access-request executing unit 52, a diagnosis-request executing unit 53, an access-error determining unit 54, and a next-diagnosis-point identifying unit 55. Incidentally, the control unit 34 is, for example, an integrated circuit, such as an application specific integrated circuit (ASIC) and a field programmable gate array (FPGA), or an electronic circuit, such as a central processing unit (CPU) and a micro processing unit (MPU).

The management-table initializing unit 50 initializes the diagnosis-region management table 42. Specifically, the management-table initializing unit 50 stores a value indicating a not-yet-diagnosed bit in all bit positions in the diagnosis-region management table 42.

The request acquiring unit 51 acquires diagnosis request or access request from a higher-level device. For example, the request acquiring unit 51 acquires diagnosis request from a timer at a predetermined diagnosis interval set in the timer. Furthermore, the request acquiring unit 51 asynchronously acquires access request from a higher-level device.

The higher-access-request executing unit 52 includes an access-operation determining unit 52a and an access executing unit 52b, and executes access request from a higher-level device as a diagnosis. The access-operation determining unit 52a determines an access operation relating to access request from the higher-level device on the basis of a travel distance of the header from a location of access executed immediately preceding the access request to an access location of the access request. Specifically, the access-operation determining unit 52a determines whether the access immediately preceding the access request from the higher-level device is access by access request from the higher-level device. Then, when the immediately preceding access is not access from the higher-level device, i.e., is access by diagnosis request, the access-operation determining unit 52a determines whether a travel distance of the header from an access location of the diagnosis request to an access location of the access request is in a close range. Then, when the travel distance of the header from the access location of the diagnosis request to the access location of the access request is in the close range, the access-operation determining unit 52a decides to give priority to diagnosis of an access location subsequent to the access location of the diagnosis request. Namely, when a distance from the immediately preceding access location to the access location of the access request is in the close range, the access-operation determining unit 52a determines that there is no influence on the access request from the higher-level device even if the diagnosis is given priority, and decides to execute the diagnosis before the execution of the access request.

On the other hand, when the travel distance of the header from the access location of the diagnosis request to the access location of the access request is not in the close range, the access-operation determining unit 52a decides not to give priority to the diagnosis. Namely, when a distance from the immediately preceding access location to the access location of the access request is not in the close range, the access-operation determining unit 52a determines that if the diagnosis is given priority, it affects the access request from the higher-level device, and therefore decides not to execute the diagnosis before the execution of the access request. Incidentally, the close range of travel distance is, for example, 100 LBA (Logical Block Addressing), but is not limited to this range as long as a travel distance does not affect the access request from the higher-level device even if the diagnosis is given priority, and is decided according to a type of the HDD 25 and the performance of the header.

Furthermore, when the immediately preceding access is access from the higher-level device, the access-operation determining unit 52a determines whether a travel distance of the header from the immediately preceding access location to the access location of the current access request is equal to or more than an average value. Then, when the travel distance of the header from the immediately preceding access location to the access location of the current access request is equal to or more than the average value, the access-operation determining unit 52a decides to prefetch an access location subsequent to the immediately preceding access location. To "prefetch" here means to diagnose a not-yet-diagnosed access location in advance at timing of access request from the higher-level device during access by the access request. Namely, if a travel distance from the immediately preceding access location to the access location of the access request is equal to or more than the average value, a seek time is longer than average; therefore, a rate of an access time used for the prefetch in an access time used for the access request is relatively low. Consequently, the access-operation determining unit 52a determines that the influence on the access request is small, and decides to execute the prefetch before the execution of the access request.

When the travel distance of the header from the immediately preceding access location to the access location of the current access request is less than the average value, the access-operation determining unit 52a decides not to execute the prefetch. Namely, if a travel distance from the immediately preceding access location to the access location of the access request is less than the average value, a seek time is shorter than average; therefore, a rate of an access time used for the prefetch in an access time used for the access request is relatively high. Consequently, the access-operation determining unit 52a determines that the influence on the access request is large, and decides not to execute the prefetch before the execution of the access request. Incidentally, the average value of travel distance is, for example, 1000 LBA, but is not limited to this as long as a travel distance does not affect the access request from the higher-level device even if the prefetch is executed, and is decided according to a type of the HDD 25 and the performance of the header.

The access executing unit 52b accesses the HDD 25 on the basis of the access operation determined by the access-operation determining unit 52a with respect to access request from the higher-level device. Specifically, when immediately preceding access is access by diagnosis request and a decision to give priority to diagnosis has been made, the access executing unit 52b executes diagnosis of an access location subsequent to the access location of the diagnosis request. After the execution of the diagnosis, the access executing unit 52b accesses an access location of the access request from the higher-level device. A result of this access is used as a diagnosis result. Furthermore, when immediately preceding access is access by diagnosis request and a decision not to give priority to diagnosis has been made, the access executing unit 52b accesses an access location of the access request from the higher-level device. A result of this access is used as a diagnosis result.

Moreover, when immediately preceding access is access from the higher-level device and a decision to prefetch has been made, the access executing unit 52b executes the prefetch of an access location subsequent to the immediately preceding access location. Then, after the execution of the prefetch, the access executing unit 52b accesses an access location of the access request from the higher-level device. Respective results of the prefetch and the access are used as a diagnosis result. Furthermore, when immediately preceding access is access from the higher-level device and a decision not to prefetch has been made, the access executing unit 52b accesses an access location of the access request from the higher-level device. A result of this access is used as a diagnosis result.

Figure 4:
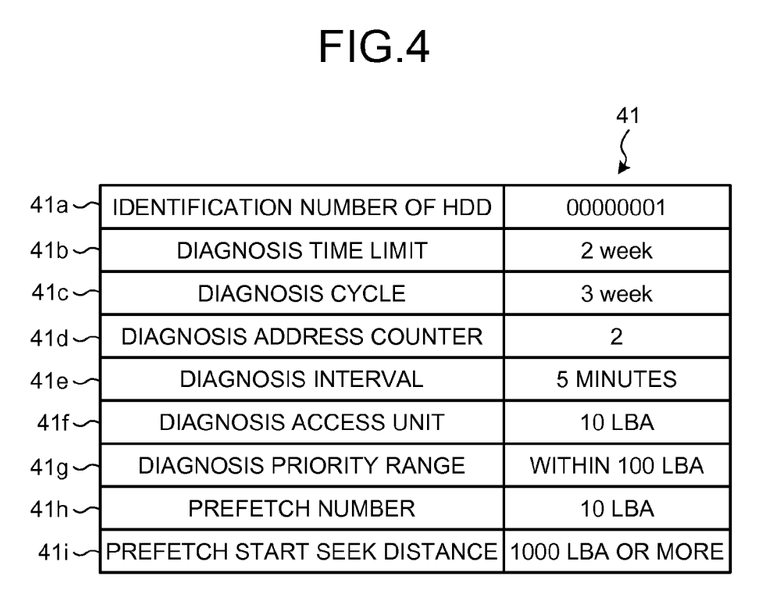
FIG. 4 is a diagram illustrating an example of the data structure of a diagnosis condition table.

The diagnosis-request executing unit 53 diagnoses an access location to be diagnosed by using the diagnosis condition table 41. Here, the data structure of the diagnosis condition table 41 is explained with reference to FIG. 4. FIG. 4 is a diagram illustrating an example of the data structure of the diagnosis condition table. As illustrated in FIG. 4, the diagnosis condition table 41 stores therein diagnosis time limit 41b, diagnosis cycle 41c, diagnosis address counter 41d, and diagnosis interval 41e with respect to each identification number 41a of HDD 25 in a manner associated with one another. The diagnosis condition table 41 further stores therein diagnosis access unit 41f, diagnosis priority range 41g, prefetch number 41h, and prefetch start seek distance 41i with respect to each identification number 41a of HDD 25 in a manner associated with one another.

The identification number 41a of HDD 25 indicates a unique number assigned to each HDD 25 which is subject to diagnosis and is connected to the HDD controller 32. The diagnosis time limit 41b indicates a limit of time for diagnoses of storage regions to be diagnosed in the HDD 25. The diagnosis cycle 41c indicates a diagnosis cycle in the HDD 25. The diagnosis address counter 41d indicates a counter corresponding to an access location of the HDD 25 to be diagnosed next. A count value of the diagnosis address counter 41d corresponds to a bit position in the diagnosis-region management table 42. The diagnosis interval 41e indicates an interval between diagnoses made once in each diagnosis time limit 41b. A diagnosis point in one diagnosis is an access location of the HDD 25 corresponding to the counter indicated in the diagnosis address counter 41d.

The diagnosis access unit 41f indicates a unit of access for one diagnosis. The diagnosis priority range 41g indicates a range of seek distance capable of diagnosis in preference to access request from a higher-level device. For example, the diagnosis priority range 41g indicates a travel distance recognized as being in the close range. The prefetch number 41h indicates a unit of access for one prefetch. It is preferable that the prefetch number 41h is identical to the diagnosis access unit 41f. The prefetch start seek distance 41i indicates a range of seek distance capable of prefetch before the execution of access request from the higher-level device. For example, the prefetch start seek distance 41i indicates an average travel distance of the header.

For example, in the diagnosis time limit 41b, "2week" indicating two weeks is stored. In the diagnosis cycle 41c, "3week" indicating three weeks is stored. In the diagnosis address counter 41d, "2" as a bit position in the diagnosis-region management table 42 corresponding to an access location to be diagnosed next is stored. In the diagnosis interval 41e, "5 minutes" is stored. In the diagnosis access unit 41f, "10 LBA" is stored. In the diagnosis priority range 41g, "within 100 LBA" is stored. In the prefetch number 41h, "10 LBA" is stored. In the prefetch start seek distance 41i, "1000 LBA or more" is stored.

To return to FIG. 3, specifically, when the request acquired by the request acquiring unit 51 is diagnosis request, the diagnosis-request executing unit 53 diagnoses an access location of the HDD 25 corresponding to the counter indicated in the diagnosis address counter 41d.

The access-error determining unit 54 determines whether there is any malfunction in access to the HDD 25, and, when having determined that there is a malfunction in access to the HDD 25, repairs the malfunction. Specifically, the access-error determining unit 54 determines whether there is any malfunction in access to an access location accessed by the access executing unit 52b or the diagnosis-request executing unit 53. Then, when there is no access malfunction, the access-error determining unit 54 stores a value indicating a diagnosed bit in a bit position in the diagnosis-region management table 42 corresponding to the normally-accessed access location. On the other hand, when there is an access malfunction, the access-error determining unit 54 determines whether the malfunction is correctable or not. When the malfunction is correctable, the access-error determining unit 54 corrects the read data by using an embedded ECC code and writes corrected data into the same part. On the other hand, when the malfunction is uncorrectable, the access-error determining unit 54 repeatedly reads out data until the malfunction has been repaired with a limit of the predetermined number of retries. Then, when the malfunction has been repaired, the access-error determining unit 54 stores a value indicating a diagnosed bit in a bit position in the diagnosis-region management table 42 corresponding to the access location of which the malfunction has been repaired. When the malfunction has not been repaired, the access-error determining unit 54 performs error processing corresponding to the malfunction. Incidentally, a correctable malfunction is, for example, the occurrence of bit corruption due to a soft error, degradation of the storage medium, ambient temperature, vibration, or noise.

The next-diagnosis-point identifying unit 55 identifies a diagnosis point to be diagnosed next by diagnosis request. Specifically, when an access location corresponding to the diagnosis address counter 41d has been diagnosed, the next-diagnosis-point identifying unit 55 increments the counter indicated in the diagnosis address counter 41d on the basis of the diagnosis-region management table 42. Namely, when a bit position in the diagnosis-region management table 42 indicated by the incremented counter has already been diagnosed, the next-diagnosis-point identifying unit 55 increments the counter to a number corresponding to a not-yet-diagnosed bit position.

Furthermore, when access by access request from the higher-level device or access due to prefetch has been gained, the next-diagnosis-point identifying unit 55 adjusts the counter indicated in the diagnosis address counter 41d on the basis of the diagnosis-region management table 42. Namely, when an access location corresponds to the counter indicated in the diagnosis address counter 41d, the next-diagnosis-point identifying unit 55 determines that the access location has already been diagnosed, and increments the counter to a number corresponding to a not-yet-diagnosed bit position.

Figure 5:
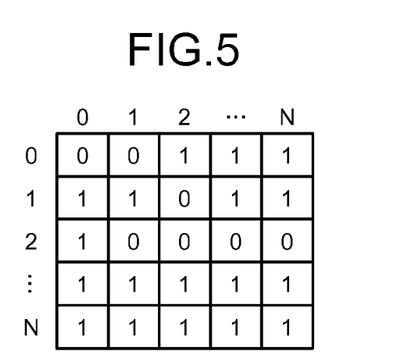
FIG. 5 is a diagram illustrating an example of the data structure of a diagnosis-region management table.

Subsequently, the data structure of the diagnosis-region management table 42 is explained with reference to FIG. 5. FIG. 5 is a diagram illustrating an example of the data structure of the diagnosis-region management table. As illustrated in FIG. 5, the diagnosis-region management table 42 stores therein a value indicating whether each bit has been diagnosed or not to be associated with the bit on a bit-by-bit basis. Here, "0" is stored when a bit has been diagnosed, and "1" is stored when a bit has not yet been diagnosed.

Each bit is a bit corresponding to an access location of the HDD 25 to be diagnosed. The counter indicated in the diagnosis address counter 41d represents a bit position in the diagnosis-region management table 42.

Procedure of storage-medium diagnosis process according to second embodiment

Figure 6:
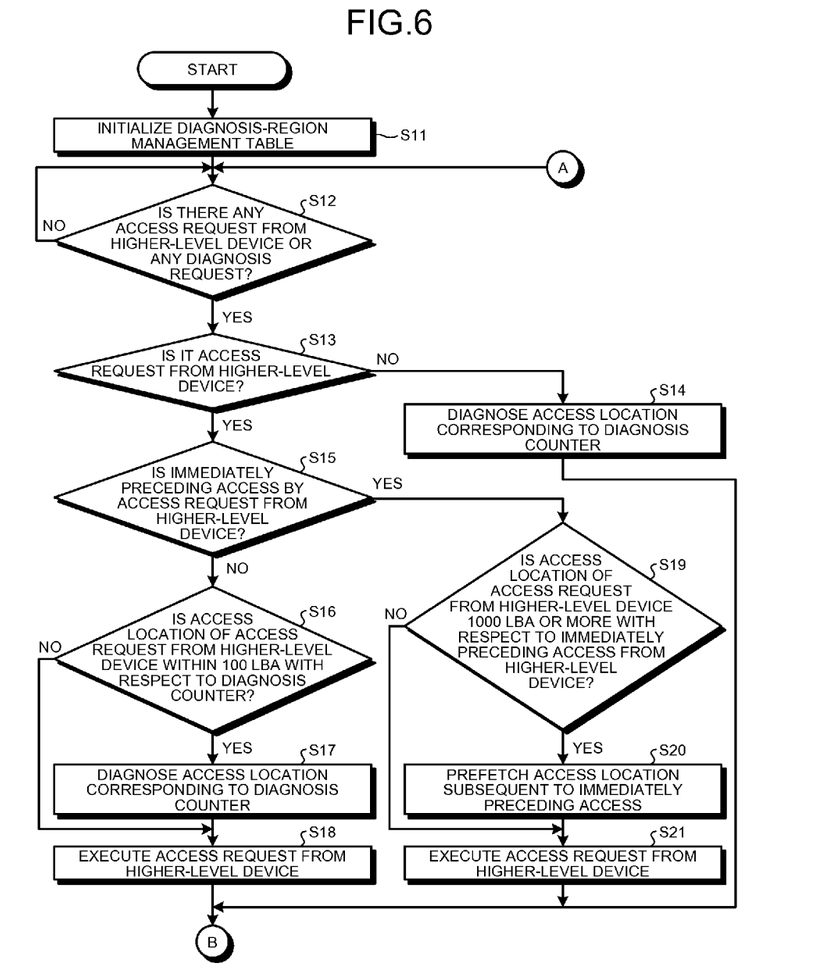
FIG. 6 is a flowchart illustrating a procedure of main processing in a storage-medium diagnosis process according to the second embodiment.
Figure 7:
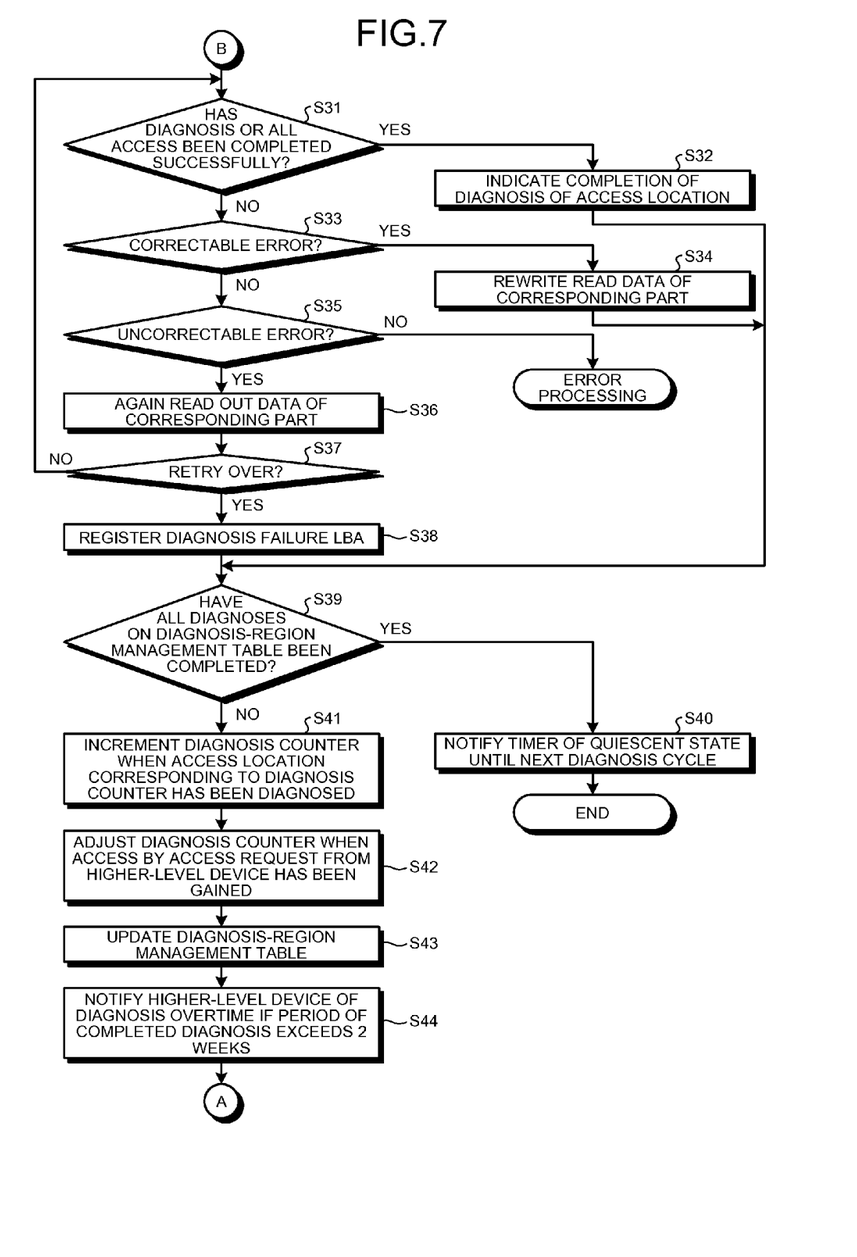
FIG. 7 is a flowchart illustrating a procedure of an access-error determining process in the storage-medium diagnosis process.

Subsequently, a procedure of a storage-medium diagnosis process is explained with reference to FIGS. 6 and 7. FIG. 6 illustrates a procedure of main processing in the storage-medium diagnosis process, and FIG. 7 illustrates a procedure of an access-error determining process in the storage-medium diagnosis process. FIG. 6 is a flowchart illustrating the procedure of the main processing in the storage-medium diagnosis process according to the second embodiment.

First, the management-table initializing unit 50 initializes the diagnosis-region management table 42 (Step S11). Specifically, the management-table initializing unit 50 stores a value indicating a not-yet-diagnosed bit (for example, "1") in all bit positions in the diagnosis-region management table 42. Then, the request acquiring unit 51 determines whether there is any access request from a higher-level device or any diagnosis request (Step S12). Incidentally, access request from a higher-level device is asynchronously acquired from the higher-level device. Diagnosis request is acquired from a timer at the diagnosis interval set in the timer.

When the request acquiring unit 51 has determined that there is no access request from the higher-level device nor diagnosis request (NO at Step S12), the request acquiring unit 51 repeatedly performs the determining process at Step S12. On the other hand, when the request acquiring unit 51 has determined that there is access request from the higher-level device or diagnosis request (YES at Step S12), the request acquiring unit 51 determines whether it is access request from the higher-level device (Step S13).

When the request acquiring unit 51 has determined that it is not access request from the higher-level device (NO at Step S13), the diagnosis-request executing unit 53 diagnoses an access location of the HDD 25 corresponding to the diagnosis address counter 41d (Step S14). Then, the diagnosis-request executing unit 53 moves to Step S31.

On the other hand, when the request acquiring unit 51 has determined that it is access request from the higher-level device (YES at Step S13), the access-operation determining unit 52a determines whether immediately preceding access is access by access request from the higher-level device (Step S15). When the immediately preceding access is not access by access request from the higher-level device (NO at Step S15), the access-operation determining unit 52a determines whether an access location of the access request from the higher-level device is within 100 LBA with respect to the diagnosis address counter 41d (Step S16). Namely, the access-operation determining unit 52a determines whether a travel distance of the header from an access location of the immediately preceding diagnosis request to an access location of the access request is in the close range.

When an access location of the access request from the higher-level device is within 100 LBA with respect to the diagnosis address counter 41d (YES at Step S16), the access-operation determining unit 52a decides to give priority to diagnosis of an access location subsequent to the access location of the diagnosis request. Namely, the access-operation determining unit 52a determines that there is no influence on the access request from the higher-level device even if the diagnosis is given priority. Then, the access executing unit 52*b* diagnoses the access location corresponding to the diagnosis address counter 41*d* (Step S17), and then accesses the access location of the access request from the higher-level device (Step S18).

When an access location of the access request from the higher-level device is beyond 100 LBA with respect to the diagnosis address counter 41*d* (NO at Step S16), the access-operation determining unit 52*a* decides not to give priority to the diagnosis. Namely, the access-operation determining unit 52*a* determines that if the diagnosis is given priority, it affects the access request from the higher-level device. Then, the access executing unit 52*b* moves to Step S18 to access the access location of the access request from the higher-level device.

When the immediately preceding access is access by access request from the higher-level device (YES at Step S15), the access-operation determining unit 52*a* determines whether an access location of the access request from the higher-level device is at a distance of 1000 LBA or more from the immediately preceding access (Step S19). Namely, the access-operation determining unit 52*a* determines whether a travel distance of the header from a location of the immediately preceding access to an access location of the current access request is equal to or more than the average value.

When an access location of the access request from the higher-level device is at a distance of 1000 LBA or more from the immediately preceding access (YES at Step S19), the access-operation determining unit 52*a* decides to prefetch an access location subsequent to the immediately preceding access location. Namely, the access-operation determining unit 52*a* determines that there is no influence on the access request from the higher-level device even if the prefetch is executed. Then, the access executing unit 52*b* executes the prefetch of an access location subsequent to the immediately preceding access location (Step S20). After that, the access executing unit 52*b* accesses the access location of the access request from the higher-level device (Step S21).

When an access location of the access request from the higher-level device is at a distance of less than 1000 LBA from the immediately preceding access (NO at Step S19), the access-operation determining unit 52*a* decides not to execute the prefetch. Namely, the access-operation determining unit 52*a* determines that if the prefetch is executed, it affects the access request from the higher-level device. Then, the access executing unit 52*b* moves to Step S21 to access the access location of the access request from the higher-level device.

Subsequently, FIG. 7 is a flowchart illustrating the procedure of the access-error determining process in the storage-medium diagnosis process according to the second embodiment.

First, the access-error determining unit 54 determines whether the access to the access location by the access executing unit 52*b* or the diagnosis-request executing unit 53 has been completed successfully (Step S31). When the access-error determining unit 54 has determined that the access has been completed successfully (YES at Step S31), the access-error determining unit 54 informs an indication of completion of the successfully-completed diagnosis of the access location (Step S32). Then, the access-error determining unit 54 stores a value indicating a diagnosed bit (for example, "0") in a bit position in the diagnosis-region management table 42 corresponding to the access location of which the diagnosis has been completed.

When the access-error determining unit 54 has determined that the access has not been completed successfully (NO at Step S31), the access-error determining unit 54 determines whether a malfunction is correctable or not (Step S33). When the access-error determining unit 54 has determined that it is a correctable malfunction (YES at Step S33), the access-error determining unit 54 corrects the read data, for example, by using an ECC code and again writes corrected data into the corresponding part (Step S34). Then, the access-error determining unit 54 moves to Step S39.

When the access-error determining unit 54 has determined that it is not a correctable error (NO at Step S33), the access-error determining unit 54 determines whether it is an uncorrectable error or not (Step S35). When the access-error determining unit 54 has determined that it is not an uncorrectable error (NO at Step S35), the access-error determining unit 54 performs error processing corresponding to the cause of the malfunction, and ends the process.

On the other hand, when the access-error determining unit 54 has determined that it is an uncorrectable error (YES at Step S35), the access-error determining unit 54 again reads out data of the corresponding part (Step S36). Then, the access-error determining unit 54 determines whether the number of retries exceeds a predetermined number (Step S37). When the access-error determining unit 54 has determined that the number of retries does not exceed the predetermined number (NO at Step S37), the access-error determining unit 54 returns to Step S31. On the other hand, when the access-error determining unit 54 has determined that the number of retries exceeds the predetermined number (YES at Step S37), the access-error determining unit 54 registers the corresponding part as a diagnosis failure LBA (Step S38).

After that, the next-diagnosis-point identifying unit 55 determines whether all diagnoses on the diagnosis-region management table 42 have been completed (Step S39). Specifically, the next-diagnosis-point identifying unit 55 determines whether values of all bits in the diagnosis-region management table 42 are a value indicating a diagnosed bit (for example, "0").

When having determined that the all diagnoses have been completed (YES at Step S39), the next-diagnosis-point identifying unit 55 notifies the timer of a quiescent state until the next diagnosis cycle (Step S40). On the other hand, when having determined that the all diagnoses have not been completed (NO at Step S39), the next-diagnosis-point identifying unit 55 identifies a value of the diagnosis address counter 41*d* on the basis of the diagnosis-region management table 42.

Namely, when an access location corresponding to the diagnosis address counter 41*d* has been diagnosed, the next-diagnosis-point identifying unit 55 increments the counter indicated in the diagnosis address counter 41*d* on the basis of the diagnosis-region management table 42 (Step S41). Incidentally, when a bit position in the diagnosis-region management table 42 indicated by the incremented counter has already been diagnosed, the next-diagnosis-point identifying unit 55 increments the counter to a number corresponding to a not-yet-diagnosed bit position.

Then, when access by access request or access due to prefetch has been gained, the next-diagnosis-point identifying unit 55 adjusts the counter indicated in the diagnosis address counter 41*d* on the basis of the diagnosis-region management table 42 (Step S42). Incidentally, when an access location corresponds to the counter indicated in the diagnosis address counter 41*d*, the next-diagnosis-point identifying unit 55 determines that the access location has already been diagnosed, and increments the counter to a number corresponding to a not-yet-diagnosed bit position.

After that, the access-error determining unit 54 updates the diagnosis-region management table 42 (Step S43). Then, if a period of the completed diagnoses exceeds two weeks which is the diagnosis time limit 41b, the access-error determining unit 54 notifies the higher-level device of diagnosis overtime (Step S44). Then, the access-error determining unit 54 returns to Step S12 to acquire next diagnosis request or next access request from the higher-level device.

Figure 8:
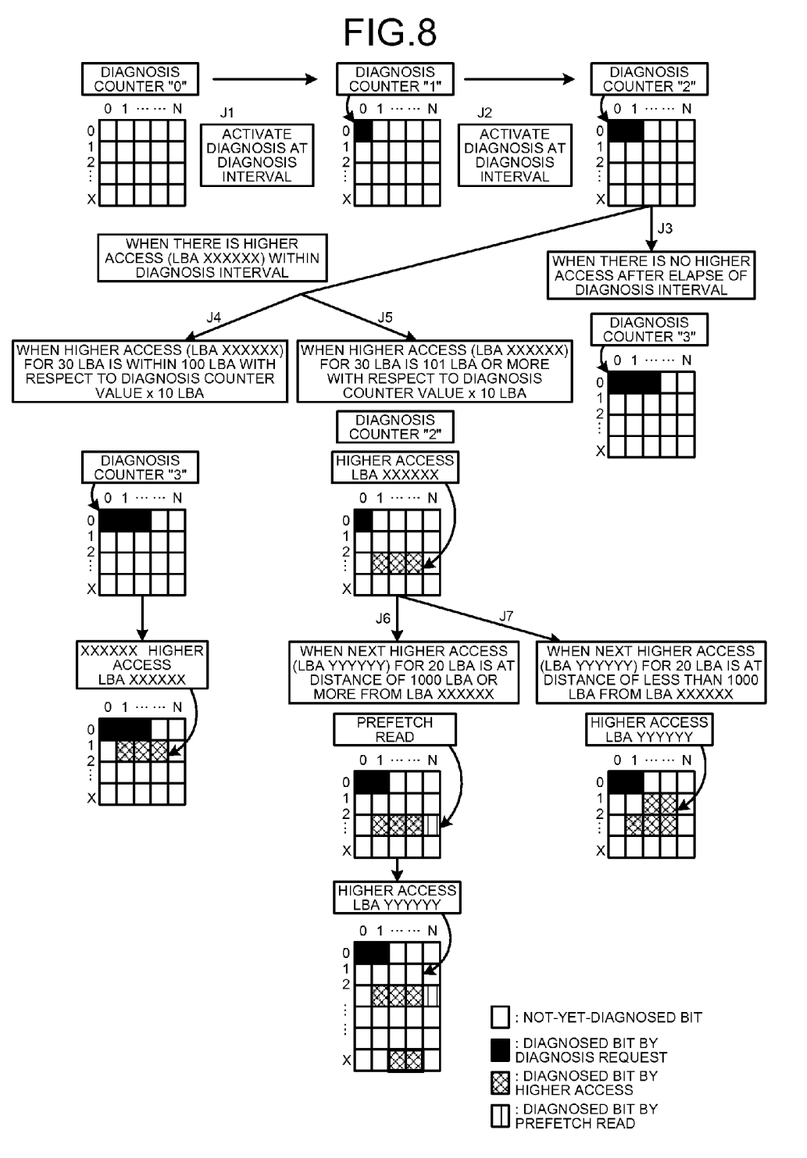
FIG. 8 is a diagram for explaining a concrete example of the storage-medium diagnosis process.

Subsequently, with a focus on the diagnosis-region management table 42 and the diagnosis address counter 41d, a concrete example of the storage-medium diagnosis process is explained with reference to FIG. 8. FIG. 8 is a diagram for explaining the concrete example of the storage-medium diagnosis process. Incidentally, for convenience of explanation, a "not-yet-diagnosed bit" in the diagnosis-region management table 42 is painted in white instead of putting a value indicating a not-yet-diagnosed bit (for example, "1"). Furthermore, a "diagnosed bit by diagnosis request" is painted in black instead of putting a value indicating a diagnosed bit (for example, "0"); a "diagnosed bit by access request from higher-level device" is marked with diagonal lines; a "diagnosed bit by prefetch" is marked with vertical lines.

First, the management-table initializing unit 50 initializes the diagnosis-region management table 42 and the diagnosis address counter 41d. Here, the management-table initializing unit 50 stores not-yet-diagnosed bits in the diagnosis-region management table 42, and stores "0" in the diagnosis address counter 41d.

When diagnosis request from the timer is activated at the diagnosis interval (J1), the diagnosis-request executing unit 53 diagnoses an access location of the HDD 25 corresponding to "0" indicated in the diagnosis address counter 41d. Then, when the access has been gained normally, the access-error determining unit 54 stores a "diagnosed bit by diagnosis request" in a bit position in the diagnosis-region management table 42 corresponding to "0" indicated in the diagnosis address counter 41d. Then, the next-diagnosis-point identifying unit 55 increments a value of the diagnosis address counter 41d by one, i.e., sets a value of the diagnosis address counter 41d to "1".

After that, when diagnosis request from the timer is activated at the diagnosis interval (J2), the diagnosis-request executing unit 53 diagnoses an access location of the HDD 25 corresponding to "1" indicated in the diagnosis address counter 41d. Then, when the access has been gained normally, the access-error determining unit 54 stores a "diagnosed bit by diagnosis request" in a bit position in the diagnosis-region management table 42 corresponding to "1" indicated in the diagnosis address counter 41d. Then, the next-diagnosis-point identifying unit 55 increments a value of the diagnosis address counter 41d by one, i.e., sets a value of the diagnosis address counter 41d to "2".

When diagnosis request from the timer is activated at the diagnosis interval (J3), the diagnosis-request executing unit 53 diagnoses an access location of the HDD 25 corresponding to "2" indicated in the diagnosis address counter 41d. Then, when the access has been gained normally, the access-error determining unit 54 stores a "diagnosed bit by diagnosis request" in a bit position in the diagnosis-region management table 42 corresponding to "2" indicated in the diagnosis address counter 41d. Then, the next-diagnosis-point identifying unit 55 increments a value of the diagnosis address counter 41d by one, i.e., sets a value of the diagnosis address counter 41d to "3".

Assume that while a value of the diagnosis address counter 41d is "2", access request is issued from the higher-level device in the diagnosis interval. And, at this time, assume that an access location of the access request from the higher-level device is within 100 LBA with respect to an access location corresponding to "2" indicated in the diagnosis address counter 41d (J4). The access-operation determining unit 52a decides to give priority to diagnosis of an access location subsequent to the access location of the diagnosis request. Then, the access executing unit 52b diagnoses the access location corresponding to "2" indicated in the diagnosis address counter 41d, and then accesses the access location of the access request from the higher-level device. Then, when the access has been gained normally, the access-error determining unit 54 stores a "diagnosed bit by diagnosis request" in a bit position in the diagnosis-region management table 42 corresponding to "2" indicated in the diagnosis address counter 41d. Furthermore, the access-error determining unit 54 stores a "diagnosed bit by access request from higher-level device" in a bit position corresponding to the access request from the higher-level device. Then, the next-diagnosis-point identifying unit 55 increments a value of the diagnosis address counter 41d by one, i.e., sets a value of the diagnosis address counter 41d to "3".

Meanwhile, assume that while a value of the diagnosis address counter 41d is "2", access request is issued from the higher-level device in the diagnosis interval. And, at this time, assume that an access location of the access request from the higher-level device exceeds 100 LBA with respect to an access location corresponding to "2" indicated in the diagnosis address counter 41d (J5). The access-operation determining unit 52a decides not to give priority to diagnosis. Then, the access executing unit 52b accesses the access location of the access request from the higher-level device. Then, when the access has been gained normally, the access-error determining unit 54 stores a "diagnosed bit by access request from higher-level device" in a bit position in the diagnosis-region management table 42 corresponding to the access request from the higher-level device.

Subsequently, assume that access request is successively issued from the higher-level device in the diagnosis interval. And, at this time, assume that an access location of the access request from the higher-level device is 1000 LBA or more with respect to the immediately preceding access location (J6). The access-operation determining unit 52a decides to prefetch an access location subsequent to the immediately preceding access location. Then, the access executing unit 52b prefetches an access location subsequent to the immediately preceding access location, and then accesses the access location of the access request from the higher-level device. Then, when the access has been gained normally, the access-error determining unit 54 stores a "diagnosed bit by prefetch" in a bit position in the diagnosis-region management table 42 corresponding to the prefetched access location. Then, the access-error determining unit 54 stores a "diagnosed bit by access request from higher-level device" in a bit position in the diagnosis-region management table 42 corresponding to the access request from the higher-level device.

Meanwhile, assume that an access location of the access request from the higher-level device is less than 1000 LBA with respect to the immediately preceding access location (J7). The access-operation determining unit 52a decides not to prefetch. Then, the access executing unit 52b accesses the access location of the access request from the higher-level device. Then, when the access has been gained normally, the access-error determining unit 54 stores a "diagnosed bit by access request from higher-level device" in a bit position in the diagnosis-region management table 42 corresponding to the access request from the higher-level device.

Effects of Second Embodiment

According to the second embodiment described above, the diagnosis-region management table 42 stores therein a result of diagnosis of a storage region of the HDD 25 in a minimal access unit. Then, when access request from the higher-level device has been acquired, the higher-access-request executing unit 52 executes the access request as a diagnosis, and causes the access-error determining unit 54 to store a value indicating that a storage region corresponding to the access request has been diagnosed in the diagnosis-region management table 42. Then, the next-diagnosis-point identifying unit 55 identifies a diagnosis region to be diagnosed next on the basis of the diagnosis result stored in the diagnosis-region management table 42. Then, the diagnosis-request executing unit 53 accesses and diagnoses the diagnosis region identified by the next-diagnosis-point identifying unit 55, and causes the access-error determining unit 54 to store a value indicating that the storage region has been diagnosed in the diagnosis-region management table 42. In such a configuration, the higher-access-request executing unit 52 executes access request from the higher-level device as a diagnosis, and stores a value indicating that a storage region corresponding to the access request has been diagnosed in the diagnosis-region management table 42. Consequently, the higher-access-request executing unit 52 eliminates the need for diagnosis of this storage region corresponding to the access request, and therefore can increase a diagnostic efficiency during operation. Furthermore, the higher-access-request executing unit 52 can reduce the time used for diagnosis of the storage medium during operation. Moreover, the server device 2 can suppress degradation in performance due to the diagnosis of the storage medium even during operation.

Furthermore, according to the above-described second embodiment, the access-operation determining unit 52*a* determines an access operation relating to access request from the higher-level device on the basis of a travel distance of the header from a location of access executed immediately preceding the access request to an access location of the access request. Then, the access executing unit 52*b* accesses the HDD 25 on the basis of the access operation determined by the access-operation determining unit 52*a*. In such a configuration, the access-operation determining unit 52*a* determines an access operation relating to access request from the higher-level device on the basis of a travel distance of the header to an access location of the access request. Consequently, the access-operation determining unit 52*a* can determine an access operation capable of suppressing degradation in performance of access from the higher-level device.

Moreover, according to the above-described second embodiment, when a travel distance of the header from an access location of diagnosis request immediately preceding the access request to an access location of the access request is in a close range, the access-operation determining unit 52*a* decides to give priority to diagnosis of an access location subsequent to the access location of the diagnosis request. In such a configuration, when a travel distance of the header is in a close range, performance of access from the higher-level device is less affected even if the diagnosis of an access location subsequent to the access location of the diagnosis request is given priority; therefore, the access-operation determining unit 52*a* can increase a diagnostic efficiency during operation. And, the access-operation determining unit 52*a* can reduce the time used for diagnosis of the HDD 25.

Furthermore, according to the above-described second embodiment, when a travel distance of the header from an access location of access request immediately preceding to current access request to an access location of the current access request is equal to or more than an average value, the access-operation determining unit 52*a* decides to diagnose an access location subsequent to the immediately preceding access location in advance. In such a configuration, when a travel distance of the header is equal to or more than the average value, performance of access from the higher-level device is less affected even if the diagnosis of an access location subsequent to the immediately preceding access location is given priority; therefore, the access-operation determining unit 52*a* can increase a diagnostic efficiency during operation. Furthermore, the access-operation determining unit 52*a* can reduce the time used for diagnosis of the HDD 25.

Incidentally, in the second embodiment, the diagnosis-region management table 42 expresses a minimal access unit of the storage region of the HDD 25 in 1 bit. However, the diagnosis-region management table 42 is not limited to this, and can be configured to express an access unit of an integral multiple of the minimal access unit of the storage region of the HDD 25 in 1 bit. In this case, using the diagnosis condition table 41, the diagnosis-request executing unit 53 accesses and diagnoses a region in the storage region of the HDD 25 in a diagnosis access unit 41*f* of the integral multiple of the minimal access unit.

Figure 9:
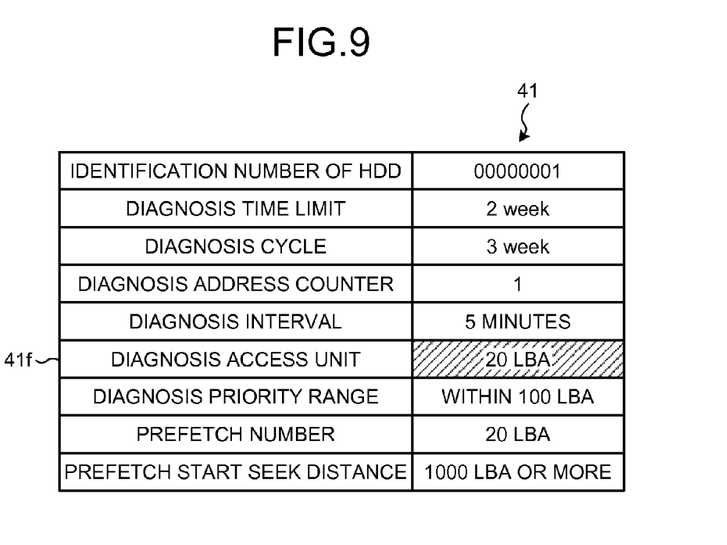
FIG. 9 is a diagram illustrating the data structure of the diagnosis condition table when a diagnosis access unit is changed.

FIG. 9 is a diagram illustrating the data structure of the diagnosis condition table 41 when a diagnosis access unit is changed. As illustrated in FIG. 9, in the diagnosis access unit 41*f*, "20 LBA" which is twice the minimal access unit of 10 LBA has been stored.

Then, the access-error determining unit 54 stores a value indicating that the region has been diagnosed in the diagnosis-region management table 42. Consequently, the diagnosis-region management table 42 can reduce the storage capacity and also reduce the time used for diagnoses of storage regions in the HDD 25. Furthermore, when a region corresponding to access request from the higher-level device is smaller than the diagnosis access unit 41*f*, the access executing unit 52*b* accesses the diagnosis access unit 41*f* of a storage region including the region. Consequently, the access executing unit 52*b* can diagnose the storage region larger than the region corresponding to the access request from the higher-level device in advance, and therefore can reduce the time used for diagnoses of storage regions in the HDD 25.

Furthermore, in the second embodiment, the diagnosis-request executing unit 53 diagnoses storage regions of the storage medium included in the HDD 25. Alternatively, the HDD 25 can have a RAID configuration, and the diagnosis-request executing unit 53 can diagnose storage regions of RAID storage media. In this case, the diagnosis-request executing unit 53 preferentially diagnoses a redundant storage medium determined by characteristics of the RAID configuration. Accordingly, the diagnosis-request executing unit 53 performs the diagnosis using the redundant storage medium, and therefore can make the diagnoses of storage regions of the storage media more efficient.

Figure 10:
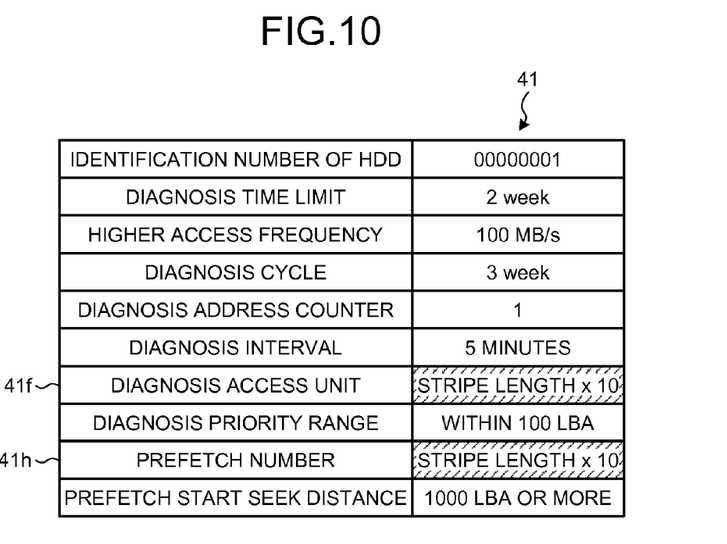
FIG. 10 is a diagram illustrating the data structure of the diagnosis condition table in a case of a RAID configuration.

FIG. 10 is a diagram illustrating the data structure of the diagnosis condition table 41 in the case of the RAID configuration. As illustrated in FIG. 10, in the diagnosis access unit 41*f* and the prefetch number 41*h*, an access unit of 10 times the stripe length has been stored.

Moreover, in the second embodiment, when a period of the diagnoses completed exceeds two weeks which is the diagnosis time limit 41*b*, the access-error determining unit 54 notifies the higher-level device of diagnosis overtime. Alternatively, the access-error determining unit 54 can be configured to monitor a diagnosis elapsed time and a diagnosis remaining capacity of a storage region, and adjust the diagnosis access unit so that the diagnoses of storage regions can be completed in the diagnosis time limit.

Figure 11:
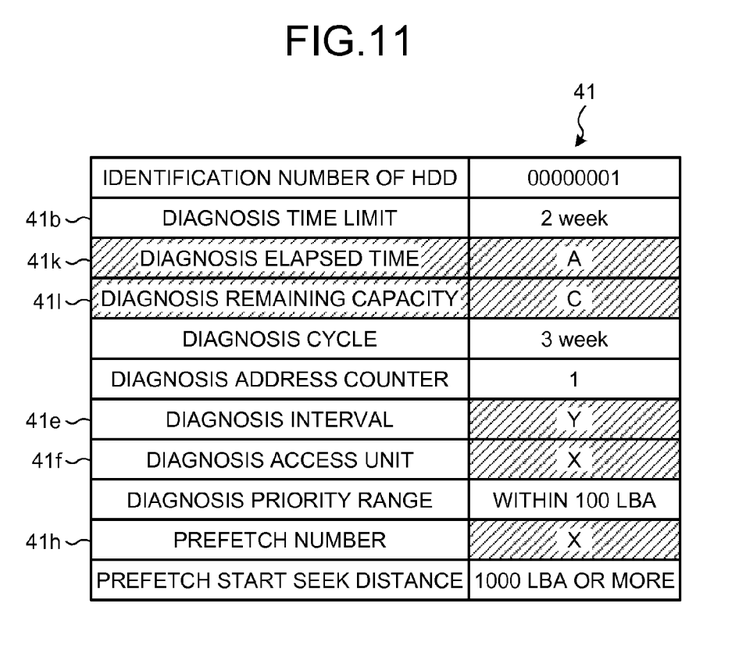
FIG. 11 is a diagram illustrating the data structure of the diagnosis condition table in a case of monitoring a diagnosis elapsed time.

FIG. 11 is a diagram illustrating the data structure of the diagnosis condition table 41 in the case of monitoring the diagnosis elapsed time. As illustrated in FIG. 11, a diagnosis elapsed time 41k and a diagnosis remaining capacity 41l are added to the diagnosis condition table 41. When the diagnosis elapsed time 41k approaches the diagnosis time limit 41b, the access-error determining unit 54 adjusts the diagnosis access unit 41f and the prefetch number 41h according to a diagnosis remaining capacity 41l. The access-error determining unit 54 can further adjust the diagnosis interval 41e.

Furthermore, in the second embodiment, the request acquiring unit 51 may acquire diagnosis request and access request from the higher-level device at the same time. Even in such a case, the access-operation determining unit 52a just determines an access operation relating to access request from the higher-level device on the basis of a travel distance of the header from a location of access executed immediately preceding the access request to an access location of the access request. Then, the access executing unit 52b executes diagnosis or prefetch of an access location subsequent to the immediately preceding access location on the basis of the access operation determined by the access-operation determining unit 52a, and executes access according to the access request. In such a configuration, while executing access according to access request from the higher-level device, the access executing unit 52b can further execute diagnosis, and therefore can improve a diagnostic efficiency.

Program, etc.

Incidentally, the HDD card 1A can be realized by equipping an information processing apparatus, such as a well-known personal computer or workstation, with functions of the above-described request acquiring unit 51, the higher-access-request executing unit 52, and the diagnosis-request executing unit 53, etc.

Furthermore, components of each unit illustrated in the drawings do not always have to be physically configured as illustrated in the drawings. Namely, the specific forms of division and integration of units are not limited to those illustrated in the drawings, and all or some of the units can be configured to be functionally or physically divided or integrated in arbitrary units depending on respective loads and use conditions, etc. For example, the higher-access-request executing unit 52 and the access-error determining unit 54 can be integrated into one unit, and the diagnosis-request executing unit 53 and the access-error determining unit 54 can be integrated into one unit. Furthermore, the access-error determining unit 54 can be divided into a determining unit that determines an access error and a repairing unit that repairs accessed data when it is determined to be an access error. Moreover, the non-volatile memory 33 can be externally connected to the HDD card 1A via a PCI-Express bus or a network as a device outside of the HDD card 1A.

Moreover, the various processes described in the above embodiment can be realized by causing a computer, such as a personal computer or a workstation, to execute a program prepared in advance. An example of a computer that executes a storage-medium diagnosis program having the same functions as the HDD card 1A illustrated in FIG. 3 is explained below with reference to FIG. 12.

Figure 12:
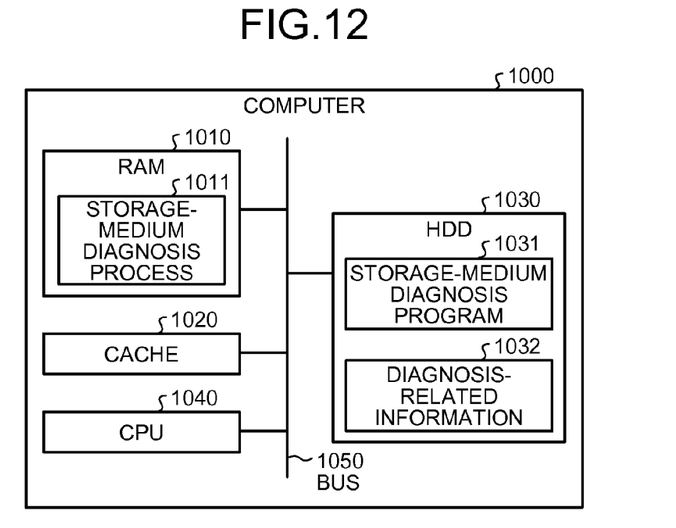
FIG. 12 is a diagram illustrating a computer that executes a storage-medium diagnosis program.

FIG. 12 is a diagram illustrating the computer that executes the storage-medium diagnosis program. As illustrated in FIG. 12, a computer 1000 includes a random access memory (RAM) 1010, a cache 1020, an HDD 1030, a central processing unit (CPU) 1040, and a bus 1050. The RAM 1010, the cache 1020, the HDD 1030, and the CPU 1040 are connected to one another by the bus 1050.

A storage-medium diagnosis program 1031 having the same functions as the HDD card 1A illustrated in FIG. 3 is stored in the HDD 1030. Furthermore, diagnosis-related information 1032 corresponding to information in the non-volatile memory 33 illustrated in FIG. 3 (the diagnosis condition table 41, the diagnosis-region management table 42) is stored in the HDD 1030.

The CPU 1040 reads out the storage-medium diagnosis program 1031 from the HDD 1030, and expands the read storage-medium diagnosis program 1031 into the RAM 1010, thereby the storage-medium diagnosis program 1031 operates as a storage-medium diagnosis process 1011. Then, the storage-medium diagnosis process 1011 arbitrarily expands information retrieved from the diagnosis-related information 1032 and the like into an assigned area on the RAM 1010, and execute various data processing on the basis of the expanded data and the like.

Incidentally, the storage-medium diagnosis program 1031 does not always have to be stored in the HDD 1030; alternatively, the computer 1000 can read out the program stored in a storage medium, such as a CD-ROM, and execute the read program. Furthermore, the program can be stored in another computer (or a server) connected to the computer 1000 via a public line, the Internet, a local area network (LAN), or a wide area network (WAN), etc. In this case, the computer 1000 reads out the program from another computer or the server, and executes the read program.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage-medium diagnosis device comprising:
   a storage unit that stores therein respective diagnosis results of subregions of a storage region of a storage medium;
   a diagnosis-region identifying unit that identifies a diagnosis region to be diagnosed next on the basis of the respective diagnosis results of the subregions stored in the storage unit;
   a diagnosis executing unit that accesses and diagnoses the diagnosis region identified by the diagnosis-region identifying unit, and stores a result of the diagnosis in the storage unit; and
   a higher-access executing unit that accesses, upon receiving an access request from a higher-level device, a region corresponding to the access request, accesses and diagnoses a predetermined subregion with the access request, and stores a result of the access as a diagnosis result in the storage unit, when the diagnosis is being performed by the diagnosis executing unit.

2. The storage-medium diagnosis device according to claim 1, wherein
   the higher-access executing unit includes an access-operation determining unit that determines an access operation relating to the access request on the basis of a travel distance of a header from a location of access executed immediately preceding the access request to an access location of the access request, and the higher-access executing unit accesses the region corresponding to the access request on the basis of the access operation determined by the access-operation determining unit.

3. The storage-medium diagnosis device according to claim 2, wherein
when the location of access executed immediately preceding the access request is an access location of the diagnosis region identified by the diagnosis-region identifying unit, and the travel distance of the header is in a close range, the access-operation determining unit decides to give priority to diagnosis of an access location subsequent to the location of access executed immediately preceding the access request.

4. The storage-medium diagnosis device according to claim 2, wherein
when the location of access executed immediately preceding the access request is an access location relating to the access request, and the travel distance of the header is more than an average value, the access-operation determining unit decides to previously diagnose an access location subsequent to the location of access executed immediately preceding the access request.

5. The storage-medium diagnosis device according to claim 1, wherein
the diagnosis executing unit accesses and diagnoses a subregion in an access unit of an integral multiple of a minimal access unit of the storage region, and stores a diagnosis result of the subregion in the storage unit.

6. The storage-medium diagnosis device according to claim 5, wherein
when the region corresponding to the access request is smaller than the access unit, the higher-access executing unit accesses the access unit of a storage region including the region corresponding to the access request.

7. The storage-medium diagnosis device according to claim 1, wherein
when the storage medium has a RAID configuration, the diagnosis executing unit preferentially diagnoses a redundant storage medium determined by characteristics of the RAID configuration.

8. A storage-medium diagnosis method for a storage-medium diagnosis device to diagnose a storage region of a storage medium, the storage-medium diagnosis method comprising:
identifying a diagnosis region to be diagnosed next on the basis of the respective diagnosis results of the subregions stored in a storage unit that stores therein respective diagnosis results of subregions of the storage region;
first accessing and diagnosing the diagnosis region identified at the identifying, and storing a result of the diagnosis in the storage unit and
second accessing, upon receiving an access request from a higher-level device, a region corresponding to the access request, accessing and diagnosing a predetermined subregion with the access request, and storing a result of the access as a diagnosis result in the storage unit, when the diagnosis is being performed at the first accessing.

9. A computer-readable recording medium having stored therein a program for causing a storage-medium diagnosis device to execute a process comprising:
identifying a diagnosis region to be diagnosed next on the basis of the respective diagnosis results of the subregions stored in the storage unit that stores therein respective diagnosis results of subregions of a storage region of a storage medium;
first accessing and diagnosing the diagnosis region identified at the identifying, and storing a result of the diagnosis in the storage unit; and
second accessing, upon receiving an access request from a higher-level device, a region corresponding to the access request, accessing and diagnosing a predetermined subregion with the access request, and storing a result of the access as a diagnosis result in the storage unit, when the diagnosis is being performed at the first accessing.

\* \* \* \* \*